US005674932A

United States Patent [19]
Agostini et al.

[11] Patent Number: 5,674,932
[45] Date of Patent: Oct. 7, 1997

[54] SILICA REINFORCED RUBBER COMPOSITION AND USE IN TIRES

[75] Inventors: Giorgio Agostini, Colmar-Berg; Uwe Ernst Frank, Ettelbruck, both of Luxembourg; Thierry Florent Edme Materne, Attert, Belgium; Friedrich Visel, Bofferdange; René Jean Zimmer, Howald, both of Luxembourg

[73] Assignee: The Goodyear Tire & Rubber Company, Akron, Ohio

[21] Appl. No.: 758,869

[22] Filed: Dec. 2, 1996

Related U.S. Application Data

[63] Continuation-in-part of Ser. No. 403,989, Mar. 14, 1995, Pat. No. 5,580,919.
[51] Int. Cl.$^6$ .................................................. C08K 3/18
[52] U.S. Cl. ........................ 524/430; 524/444; 524/445; 524/447; 524/492; 524/493; 524/495; 524/496
[58] Field of Search ............................. 524/430, 444, 524/445, 447, 492, 493, 495, 496

[56] References Cited

U.S. PATENT DOCUMENTS

| 3,978,103 | 8/1976 | Meyer-Simon et al. | 260/448.8 R |
|---|---|---|---|
| 4,076,550 | 2/1978 | Thurn et al. | 106/288 Q |
| 4,433,114 | 2/1984 | Coran et al. | 525/332.6 |

*Primary Examiner*—Edward J. Cain
*Attorney, Agent, or Firm*—Henry C. Young, Jr.

[57] ABSTRACT

The invention relates to a process for preparation of a rubber composition containing silica reinforcement through the utilization of a high purity organosilane disulfide/trisulfide.

Pneumatic tires having treads prepared by such process are provided.

76 Claims, No Drawings

SILICA REINFORCED RUBBER COMPOSITION AND USE IN TIRES

This application is a continuation-in-part of 08/403,989 filed Mar. 14, 1995 now U.S. Pat. No. 5,580,919.

FIELD

This invention relates to the preparation of rubber compositions which contain silica reinforcement and utilizing a silica coupler, or adhesive agent, in a form of a relatively high purity organosilane disulfide/trisulfide.

The invention also relates to the preparation of tires having treads thereof. In one aspect, the rubber composition is comprised of a sulfur curable rubber reinforced with a combination of silica, alumina and/or aluminosilicate, optionally carbon black, and a silica coupler, or adhesive agent, in a form of a relatively high purity organosilane disulfide.

BACKGROUND

For various applications utilizing rubber which require high strength and abrasion resistance, particularly applications such as tires and various industrial products, sulfur cured rubber is utilized which contains substantial amounts of reinforcing fillers. Carbon black is commonly used for such purpose and normally provides or enhances good physical properties for the sulfur cured rubber. Particulate, precipitated silica is also sometimes used for such purpose, particularly when the silica is used in conjunction with a coupling agent. In some cases, a combination of silica and carbon black is utilized for reinforcing fillers for various rubber products, including treads for tires.

In some cases alumina has been used for such purpose either alone or in combination with silica. The term "alumina" can be described herein as aluminum oxide, or $Al_2O_3$. Use of alumina in rubber compositions, can be shown, for example, in U.S. Pat. No. 5,116,886 and European Patent publication EPO 631,982 A2.

It is recognized that alumina can be in various forms, namely, acidic, neutral and basic forms. Generally, it is considered herein that the neutral form my be preferred.

In some cases aluminosilicates might be used for such purpose. The term "aluminosilicates" can be described as natural or synthetic materials where the silicon atoms of a silicon dioxide are partially replaced, or substituted, either naturally or synthetically, by aluminum atoms. For example, about 5 to about 90, alternatively about 10 to about 80 percent of silicon atoms of a silicon dioxide might be replaced, or substituted, naturally or synthetically, by aluminum atoms to yield an aluminosilicate. A suitable process for such preparation might be described, for example, as by a co-precipitation by pH adjustment of a basic solution, or mixture, of silicate and aluminate also, for example, by a chemical reaction between $SiO_2$, or silanols on the surface of a silicon dioxide, and $NaAlO_2$. For example, in such co-precipitation process, the synthetic co-precipitated aluminosilicate may have about 5 to about 95 of its surface composed of silica moieties and, correspondingly, about 95 to about 5 percent of its surface composed of aluminum moieties.

Examples of natural aluminosilicates are, for example, Muscovite, Beryl, Dichroite, Sepiolite and Kaolinite. Examples of synthetic aluminosilicates are, for example, Zeolite and those which might be represented by formulas such as, for example, $[(Al_2O_3)_x.(SiO_2)_y.(H_2O)_z]$; $[(Al_2O_3)_x.(SiO_2)_y.MO]$; where M is magnesium or calcium. Use of aluminosilicates in rubber compositions, can be shown, for example, in U.S. Pat. No. 5,116,886, European Patent publication EPO 063,982 A2, *Rubber Chem. Tech.*, Volume 50, page 606 (1988) and Volume 60, page 84 (1983).

It is important to appreciate that, conventionally, carbon black is a considerably more effective reinforcing filler for rubber products, and particularly for rubber tire treads than silica unless the silica is used in conjunction with a coupling agent, which may sometimes be referred to as a silica coupler or silica adhesive compound or coupling agent.

Such silica coupler or silica adhesive agent may, for example, be premixed, or pre-reacted, with the silica particles or added to the rubber mix during the rubber/silica processing, or mixing, stage. If the coupling agent and silica are added separately to the rubber mix during the rubber/silica mixing, or processing stage, it is considered that the coupling agent then combines in situ with the silica.

In particular, such coupling agents are sometimes composed of an organosilane such as an organosilane polysulfide which has a constituent component, or moiety, (the silane portion) capable of reacting with the silica surface and, also, a constituent component, or moiety, capable of reacting with the rubber, particularly a sulfur vulcanizable rubber which contains carbon-to-carbon double bonds, or unsaturation. In this manner, then, the coupler acts as a connecting bridge between the silica and the rubber and thereby enhances the rubber reinforcement aspect of the silica.

Numerous coupling agents are taught for use in combining silica and rubber, such as, for example, silane coupling agents containing a polysulfide component, or structure in which the polysulfide bridge portion may be composed of from 2 to 8 sulfur units, such as, for example, an organosilane polysulfide sometimes referred to as bis-(3-triethoxysilylpropyl)tetrasulfide, available from Degussa GmbH, for example, as Si69. It is understood that the sulfur bridge portions of such "tetrasulfide", while having an average of about 3.5 to about 4 connecting sulfur atoms, actually has from about 2 to about 6 or 8 connecting sulfur atoms in its bridge portions where not more than 25 percent of its bridge portions contain two connecting sulfur atoms. Therefore, it is considered herein that at least 75 percent of its sulfur bridge portions contain an average of greater than 3 connecting sulfur atoms and, thus, a considerable portion of the sulfur bridge contains at least 4 connecting sulfur atoms. For example, see U.S. Pat. Nos. 4,076,550; 4,704, 414; and 3,873,489.

It is recognized that such organosilane polysulfides which contain an average of greater than 3 connecting sulfur atoms and, thus, a considerable portion thereof being at least 4 sulfur atoms, in their sulfur bridges can also act as a sulfur donor for the liberation of free sulfur to participate in a vulcanization, or partial vulcanization, of a sulfur vulcanizable elastomer since free sulfur may be liberated therefrom at a temperature of, for example, about 150° C. above. It is considered herein that such recited temperature is approximate in nature and is dependent upon a choice of various individual organosilane polysulfides as well as other factors, although it is believed that at temperatures lower than about 150° C., for most practical organosilane polysulfides which contain from 3 to 8 sulfur atoms in their sulfur bridge portions, the liberation of free sulfur, if any, occurs at a relatively slow rate.

Such temperatures may be experienced, for example, in preparatory, or what is often called non-productive, mixing step for blending rubber and rubber compounding ingredients, typically exclusive of addition of free sulfur, sulfur donors and/or rubber vulcanization accelerators. Such mixing might typically occur, for example, at a temperature in a range of up to about 140° C. to about 180° C.; and most likely at least a portion of the mixing occurs at a temperature of at least 160° C. or above. The small amount of free, liberated, sulfur is then available to combine with and/or possibly partially vulcanize, the unsaturated elastomer with which the silica and coupler are being mixed in such mixing stages.

Bis-(3-triethoxysilylpropyl) disulfide, as a variety of organosilane polysulfide, is also taught as being useful as a silica coupler for a silica-containing sulfur vulcanizable elastomer composition, even as a high purity form of such disulfide in, for example, U.S. Pat. No. 4,046,550 and German Patent Publication DT 2,360,471. However, it is considered herein that such disulfide does not ordinarily liberate free sulfur in such aforementioned rubber/silica/coupler mixing operation.

In practice, sulfur vulcanized elastomer products are typically prepared by thermomechanically mixing rubber and various ingredients in a sequentially step-wise manner followed by shaping and curing the compounded rubber to form a vulcanized product.

First, for the aforesaid mixing of the rubber and various ingredients, typically exclusive of sulfur and sulfur vulcanization accelerators, the elastomer(s) and various rubber compounding ingredients are typically blended in at least one, and usually at least two, preparatory thermomechanical mixing stage(s) in suitable mixers. Such preparatory mixing is often referred to as non-productive mixing, or non-productive mixing steps or stages. Such preparatory mixing is usually conducted at temperatures up to about 140° C. to 190° C. and often up to about 150° C. to 180° C.

Subsequent to such preparatory mix stages, in a final mixing stage, sometimes referred to as a productive mix stage, sulfur and sulfur vulcanization accelerators, and possibly one or more additional ingredients, are mixed with the rubber compound, or composition, typically at a temperature in a range of about 100° C. to about 130° C., which is a lower temperature than the temperatures utilized in the preparatory mix stages in order to prevent or retard premature curing of the sulfur curable rubber, which is sometimes referred to as scorching, of the rubber composition.

The rubber mixture, sometimes referred to as a rubber compound or composition, is typically allowed to cool, sometimes after or during a process of intermediate mill mixing, between the aforesaid various mixing steps, for example, to a temperature of about 50° C. or lower.

Such sequential non-productive mixing steps, including the intermediary mill mixing steps and the concluding final mixing step are well known to those in the rubber mixing art.

By thermomechanical mixing, it is meant that the rubber compound, or composition of rubber and rubber compounding ingredients, is mixed in a rubber mixture under high shear conditions where it autogeneously heats up, with an accompanying temperature rise, as a result of the mixing primarily due to shear and associated friction within the rubber mixture in the rubber mixer.

Such thermomechanical rubber compound mixing procedure and associated sheer and accompanying temperature rise aspects are well known to those having experience in the rubber preparation and mixing art.

Where an organosilane polysulfide, or organosilicon polysulfide as it might sometimes be referred to, is used as a silica coupler in a silica reinforced, sulfur curable rubber composition, it is typically added in one or more of such preparatory, non-productive, mix stages where, as hereinbefore pointed out, the mixing may typically occur at a temperature up to, for example, about 140° C. to about 190° C. or perhaps up to about 150° C. to about 180° C.

Uniquely, when such hereinbefore described organosilane polysulfide containing an average of greater than three and, thus, a considerable portion thereof being at least 4, connecting, or connected-in-series, bridge sulfur units is utilized and added in an aforesaid preparatory mix stage in which sulfur vulcanizable elastomers, silica and associated compounding ingredients are mixed to a temperature to, for example, about 140° C. to about 180° C., at least three chemical reactions are considered herein to take place.

The first reaction is a relatively fast reaction and is considered herein to take place between the silica and the silane moiety of an organosilane, such as, for example, an organosilane polysulfide. Such reaction may occur at a relatively low temperature such as, for example, at about 120° C. Such reaction is well known to those having experience in the silica reinforcement of sulfur vulcanizable elastomers in which organosilane polysulfides are used as silica coupling agents.

The second and third reactions are considered herein to take place between the polysulfidic part of the organosilane polysulfide, or silica coupling agent, and the sulfur vulcanizable elastomer, which contains carbon-to-carbon double bonds, at a higher temperature; for example, above about 140° C. One or more of such second and third reactions are believed to be well known to those having skill or experience in such art.

The aforesaid second reaction is considered herein to consist in a degree of grafting of the organosilane polysulfide onto the elastomer backbone through a covalent bond between a sulfur of the organosilane polysulfide and a carbon atom of the polymer chain of the elastomer, probably a carbon atom alpha to a carbon-to-carbon double bond in the elastomer. Such a mechanism has been described in the literature (S. Wolff, *Rubber Chem. Tech.*, 55 (1982) 967). This reaction is believed herein to be a key for the reinforcing action of organo silane polysulfide coupling agent in silica reinforced sulfur vulcanizable, or sulfur vulcanized as the case may be, rubber compositions.

The third reaction is considered herein as being dependent upon the organosilane polysulfide as a sulfur donor, or a provider of free sulfur. Because of the nature of the thermal stability of the $S_x$ (where the average of x is greater than 3, and usually at least 3.5, thus having a considerable portion of x being at least 4) bridge of the organosilane polysulfide, the energy and associated resultant temperature, particularly a temperature in a range of about 150° C. to about 180° C., involved in thermomechanical mixing of rubber compositions is sufficient to break the sulfur bridge of organosilanes polysulfides with a sulfur bridge of an average of three or more, and usually at least 3.5, with at least therefor a considerable portion of the polysulfide bridge being 4 or more, connecting sulfur atoms. Thus, a small amount of free sulfur is usually formed. Such small amount of liberated free sulfur is then available to partially vulcanize the elastomer in a normal elastomer vulcanization manner. Such partial vulcanizing, or curing, can be considered as somewhat of a side reaction in a sense that such vulcanization is not considered herein as a direct aspect of coupling the silica to the rubber via the silica coupler, or adhesive agent. Indeed, such pre- or partial vulcanization, or partial crosslinking, of the elastomer by the liberated free sulfur can lead to significant processing difficulties where the resultant viscosity of the rubber composition becomes too high to be suitably processed in typical rubber mixing and/or processing equipment or, in an alternative, the resultant viscosity of the rubber composition may becomes somewhat inconsistent from rubber batch to rubber batch, particularly where the rubber composition mixing time or temperature may incrementally vary.

Accordingly, and in part because of the complexity of the combination of both the aforesaid desirable silane-polymer chemical reaction and, also, the sulfur donor effect of the organosilane polysulfide containing a bridge of three or more connecting sulfur atoms, occurring within the aforesaid rubber composition mixing processes at temperatures in a range of about 140° C. to about 180° C. under high sheer conditions, it has been observed that it is sometimes difficult to obtain a consistent rubber product, from rubber mixture to rubber mixture, as may be evidenced by rubber products with inconsistent physical properties. Accordingly, the complexity of the possible reaction mechanisms makes it very difficult, if not impractical in some cases, to suitably control the overall reaction of the organosilane polysulfide reaction and the processing of the rubber, particularly during the non-productive mixing steps while the aforesaid multiplicity of chemical reactions are taking place.

It is proposed, and as hereinafter set forth has been discovered, that a very different and more controllable sulfur/rubber interaction can be effected where the aforesaid covalent bonding between the silane coupling agent and the elastomer (aforesaid second reaction) on the one hand and the aforesaid sulfur donor effect (aforesaid third reaction) on the other hand are decoupled from each other, at least insofar as the organosilane polysulfide is concerned.

Indeed, such decoupling is considered herein to be an important and significant aspect of the invention.

In order to accomplish the decoupling effect, it is envisioned to limit the organosilane polysulfide to an organosilane polysulfide in which the polysulfide is limited to a profiled disulfide/trisulfide, or at least a relatively high purity disulfide/trisulfide. Such high purity organosilane disulfide/trisulfide would contain minimal, if any, attendant, or accompanying, organosilane polysulfides containing a sulfur bridge of four and particularly a minimalization such sulfur bridges containing more than 4 connecting sulfur atoms.

The action of the profiled organosilane disulfide/trisulfide might be explained, for example, in the following way:

First, the disulfide moiety, and it is considered herein, for the most part the trisulfide moiety, of the organosilane disulfide does not appreciably or readily form free sulfur during the aforesaid preparatory, non-productive rubber mixing steps at temperatures in a range of 140° C. to 180° C., particularly during the relatively short individual mixing periods in a typical rubber mixing step, or sequential series of, as the case may be, mixing steps, in a rubber mixer or mixers of an overall mixing period, of, for example, less than about 15 minutes or perhaps even 20 or more minutes. This is because, for the organosilane polysulfide, the energy required to break the sulfur-to-sulfur bonds of the disulfidic bridge, and for the most part the trisulfidic bridge, and/or the associated carbon-to-sulfur bonds adjacent to the disulfidic bridge or trisulfidic bridge is much higher than the energy needed to similarly break such bonds for a polysulfidic bridge composed of 4 or more connecting sulfur atoms in an otherwise similar organosilane polysulfide.

Therefore, it has occurred to the inventors that, in a process of mixing sulfur curable rubber, silica and organosilane polysulfide at elevated temperatures, the reaction involving the formation of a covalent bond between the organosilane polysulfide and the elastomer (aforesaid second reaction) can be decoupled from a sulfur donating effect (aforesaid third reaction) may be accomplished by using such organosilane polysulfide in a form of a profiled polysulfide bridge or relatively high purity combination of disulfide and trisulfide version, with a minimal amount, if any of tetrasulfide, of the polysulfide in combination with a separate and independent addition of a vulcanization accelerator, or a sulfur source such as, for example, a source of free, or elemental, sulfur or a combination of both vulcanization accelerator and sulfur source during a said preparatory rubber composition mixing step for preparing a rubber composition.

By the term "profiled", it is meant that the aforesaid organosilane disulfide/trisulfide is used in a high purity form in which its major portion is the disulfide and a more minor portion is the trisulfide.

Such aforesaid sulfur source may be, for example, in a form of elemental sulfur, or $S_8$ itself, or a sulfur donor. A sulfur donor is considered herein as a sulfur containing organic compound which liberates free, or elemental sulfur, at a temperature in a range of about 140° C. to about 190° C. Such sulfur donors may be, for example, although are not limited to, polysulfide vulcanization accelerators and organosilane polysulfides with at least three connecting sulfur atoms in its polysulfide bridge.

The amount of free sulfur source addition to the mixture can be controlled or manipulated as a matter of choice relatively independently from the addition of the aforesaid organosilane disulfide. Thus, for example, the independent addition of sulfur source may be manipulated by the amount of addition thereof and by sequence of addition relative to addition of other ingredients to the rubber mixture such as, for example, the silica reinforcement.

In such manner, then, the organosilane polysulfide composed of the relatively high purity profiled disulfide and trisulfide content, with its accompanying two and three connecting sulfur atoms in its sulfur bridge portion, could be utilized for the aforesaid first and second associated reactions and the independent addition of the sulfur source particularly a free sulfur source, could be primarily relied upon for the aforesaid third reaction.

Thus, it is considered herein, that at least a partial decoupling of the aforesaid reactions is postulated.

It is considered herein that such manipulation of the sulfur/rubber interaction, combined with the aforesaid silane/silica interaction in a preparatory rubber mixing step is a significant departure from known prior practice.

It is recognized that prior patent publications recite, or include, the use of organosilane disulfides as silica couplers in elastomer formulations. For example, see U.S. Pat. No. 4,076,550 and German Patent Publication DT 2,360,470 A1. However, it is believed that the inventors' prescribed procedure of utilizing a relatively high purity organosilane disulfide in combination with independently adding a free sulfur source in a preparatory rubber-silica mixing step, particularly as a means of controlling the associated sulfur/elastomer interaction is an inventive departure from prior practice. Such procedure has been observed to provide a better reproducibility of rubber compound physical properties as well as considerably greater compounding, or mixing, flexibility as indicated by the controllable reaction effect.

Further to the aforesaid inventive concept, it is also considered herein that an addition of an alkyl silane to the coupling agent system (organosilane disulfide plus additional free sulfur source and/or vulcanization accelerator) typically in a mole ratio of alkyl silane to organosilane disulfide in a range of about 1/50 to about 1/2 promotes an even better control of rubber composition, or compound, processing, and usually resultant compound aging under aging conditions such as exposure to moisture and/or ozone.

The term "phr" as used herein, and according to conventional practice, refers to "parts of a respective material per 100 parts by weight of rubber, or elastomer".

In the description of this invention, the terms "rubber" and "elastomer" if used herein, may be used interchangeably, unless otherwise prescribed. The terms such as "rubber composition", "compounded rubber" and "rubber compound", if used herein, are used interchangeably to refer to rubber which has been blended or mixed with various ingredients and materials and "rubber compounding" or "compounding" may be used to refer to the mixing of such materials. Such terms are well known to those having skill in the rubber mixing or rubber compounding art.

A reference to an elastomer's Tg, if used herein, refers to a glass transition temperature which can be determined by a differential scanning calorimeter at a heating rate of 10° C. per minute.

SUMMARY AND PRACTICE OF THE INVENTION

In accordance with one aspect of this invention, a rubber composition is prepared by a process which comprises the sequential steps of:

(A) thermomechanically mixing in at least one preparatory mixing step to a temperature of about 140° C. to about 190° C., alternatively to about 150° C. to about 185° C., for a total mixing time of about 2 to about 20, alternatively about 4 to about 15, minutes for such mixing step(s) (i) 100 parts by weight of at least one sulfur vulcanizable elastomer selected from conjugated diene homopolymers and copolymers and copolymers of at least one conjugated diene and aromatic vinyl compound, (ii) about 15 to about 100, alternatively about 30 to about 90, phr of particulate filler comprised of at least one of precipitated silica, alumina, aluminosilicate and carbon black, wherein said filler contains about 5 to about 85 weight percent carbon black, (iii) about 0.05 to about 20 parts by weight per part by weight of said particulate filler of at least one organosilane disulfide/trisulfide compound having the formula:

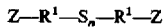

wherein n is an integer of from 2 to 6 provided, however, that about 55 to about 75 percent of n is 2, about 15 to about 35 percent of n is 3 and about 2 to about 10 percent of n is 4 and less than 10 percent of n is greater than 4, provided that the sum of n=2 and n=3 is in a range of 90 to about 98 percent of n; wherein Z is selected from the group consisting of:

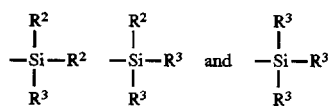

wherein $R^2$ may be the same or different and is individually selected from the group consisting of alkyl group having 1 to 4 carbons and phenyl; $R^3$ may be the same or different and is individually selected from the group consisting of alkyl groups having 1 to 4 carbon atoms, phenyl, alkoxy groups having 1 to 8 carbon atoms and cycloalkoxy groups with 5 to 8 carbon atoms; and $R^1$ is selected from the group consisting of a substituted or unsubstituted alkylene group having a total of 1 to 18 carbon atoms and a substituted or unsubstituted arylene group having a total of 6 to 12 carbon atoms;

(iv) at least one additional additive as a compound selected from (a) a free sulfur source selected from at least one of (1) elemental sulfur and (2) at least one sulfur donor as a polysulfidic organic compound containing sulfur and having a property of releasing at least a portion of said sulfur at a temperature in a range of about 140° C. to about 190° C.; provided, however, that the total of said free sulfur from said elemental sulfur addition and available from said sulfur donor addition is in a range of about 0.05 to about 2 phr, alternatively about 0.2 to about 1 phr, and (b) about 0.1 to about 0.5, alternatively about 0.1 to about 0.3, phr of at least one vulcanization accelerator for sulfur vulcanizable elastomers that is not such a sulfur donor;

(B) subsequently blending therewith, in a final thermomechanical mixing step at a temperature to about 100° C. to about 130° C. for a time of about 1 to about 3 minutes, about 0.4 to about 3 phr of elemental sulfur provided, however, that the total elemental sulfur and sulfur available from said sulfur donor addition introduced in said preparatory mixing steps and elemental sulfur added in said final mixing step is in a range of about 0.45 to about 5 phr, and at least one sulfur vulcanization accelerator.

In one aspect of the invention such process is provided wherein said preparatory mixing is conducted in at least two thermomechanical mixing steps, of which at least two of such mixing steps are to a temperature in a range of about 140° C. to about 190° C., with intermediate cooling of the rubber composition between at least two of said mixing steps to a temperature below about 50° C.

In further accordance with this invention, a rubber composition is prepared wherein preparatory steps (A) are composed of at least two sequential mixing steps in which said elastomer, said particulate filler and said organosilane polysulfide compound, in which 55 to 75 percent of n is 2, 5 to 35 percent of n is 3 and the sum of n=2 plus n=3 is from 90 to 98 percent of n, are mixed in one or more sequential mixing steps and in which said sulfur source and/or vulcanization accelerator is/are added in a subsequent sequential preparatory mixing step.

In additional accordance with this invention, a rubber composition is prepared wherein said preparatory steps (A) are composed of at least two sequential mixing steps in which about 20 to about 60 weight percent of the silica, the said organosilane disulfide compound and said sulfur source and/or vulcanization accelerator are added in the first mix step and the remainder thereof added in at least one subsequent preparatory mix step.

It is considered herein that it is a significant aspect of this invention that the high purity of the organosilane disulfide/trisulfide for use in this invention is represented by the aforesaid formula in which at least 55 percent of n is 2, 5 to 35 percent of n is 3 and from 2 to 10 percent of n is 4 and wherein the sum of n=2 and n=3 is at least 90 percent of n.

Thus, the high purity of the disulfide/trisulfide is presented in a form of a polysulfide gradient with specified ranges of disulfide and trisulfide units for the polysulfide bridge with only a minimal of n=4 for the polysulfide bridge. It is desired herein that n=2 is 55 to 75 percent of n, that n=3 be from 15 to 35 percent of n and the sum of n=2 plus n=3 is 90 to 98 percent of n because it is considered herein that such profile, or gradient of disulfide/trisulfide, with the major portion thereof being n=2 and a minor portion being n=3, is advantageous over simply using high purity disulfide alone in which the disulfide is used in a pure form, or is at least 80 percent of n and particularly with the associated minimalization of n=4. This is considered herein to be advantageous and beneficial in that similar rubber composition physical properties can be obtained, yet the physical processing of the rubber composition (e.g. the physical mixing, the stock viscosity) can be accomplished as easily and/or as efficiently. The main advantage of such profiled material being to get similar properties (physicals and processing) as the pure disulfide with n=2 being at least 80 percent of n or higher but with a significantly lower cost of the raw material (silane) essentially because of the reduced cost of the synthesis of such a lower purity silane coupling agent.

It is desired that n=4 and above be a maximum of about 10 percent of n in order to limit a generation and liberation of free sulfur from the organosilane in the rubber mixing process.

In accordance with the process of this invention, the said high purity profiled organosilane disulfide and trisulfide, namely, the said organosilane polysulfide compound, with the prescribed gradient, or profile, for n of the aforesaid formula in which n is predominantly equal to 2 and 3, is optionally added to the thermomechanical preparatory mixing in a form of a particulate comprised of (a) about 25 to about 75, preferably about 40 to about 60, weight percent of said organosilane profiled polysulfide compound and, correspondingly, (b) about 75 to about 25, preferably about 60 to about 40, weight percent particulate carbon black. A purpose of providing the high purity organosilane disulfide/ trisulfide in a form of a particulate in the process of this invention is to add the high purity organosilane disulfide/ trisulfide in a form of a relatively dry, or substantially dry, powder in which the carbon black acts as a carrier for the high purity organosilane disulfide/trisulfide in the process of this invention, since it is considered herein that the high purity disulfide/trisulfide would normally otherwise be in a liquid, or substantially liquid, form. A contemplated benefit for the particulate is to aid in the dispersing of the high purity organosilane disulfide/trisulfide in the preparatory mixing step(s) of the process of this invention and to aid in the introduction of the high purity disulfide/trisulfide into the preparatory mixing of the rubber composition mixture.

In further accordance with the invention, the process comprises the additional step of vulcanizing the prepared rubber composition at a temperature in a range of about 140° C. to about 190° C.

Accordingly, the invention also thereby contemplates a vulcanized rubber composition prepared by such process.

In additional accordance with the invention the process comprises the additional steps of preparing an assembly of a tire or sulfur vulcanizable rubber with a tread comprised of the said rubber composition prepared according to the process of this invention and vulcanizing the assembly at a temperature in a range of about 140° C. to about 190° C.

Accordingly, the invention also thereby contemplates a vulcanized tire prepared by such process.

In one aspect of the invention, optionally a total of about 0.05 to about 5 phr of at least one alkyl silane can be thermomechanically mixed in said preparatory mixing stage (s), particularly where said alkyl silane has the formula: $R'—Si—(OR)_3$, where R is a methyl, ethyl, propyl or isopropyl radical and R' is a saturated alkyl radical having from 1 to 18 carbon atoms, or an aryl or saturated alkyl substituted aryl radical having from 6 to 12 carbon atoms. Such aryl or substituted aryl radicals might be, for example, benzyl, phenyl, tolyl, methyl tolyl, and alpha methyl tolyl radicals.

A purpose of the alkyl silane is, for example, to improve filler incorporation and compound aging. Representative examples of alkyl silanes are, for example but not intended to be limited to, propyltriethoxysilane, methyltriethoxy silane, hexadecyltriethoxysilane, and octadecyltriethoxysilane.

A particular feature of this invention is the creation of a silica coupler/particulate filler composition in situ within the rubber composition in its preparatory stage by the utilization of a relatively high purity organosilane disulfide/trisulfide in combination with an addition of a sulfur source such as elemental sulfur and/or sulfur donor, and/or addition of a sulfur vulcanization accelerator which is not considered herein as a sulfur donor, in which the materials are thermomechanically mixed in at least one preparatory mixing stage to a temperature of about 140° C. to about 180° C. Indeed, by utilization of this process, it is conceivable that the rubber mixing process might the conducted at an even higher temperature range such as from about 140° C. to about 190° C.

This is considered to be a substantial departure from a practice of using, for example, 3,3'-bis(trialkoxyalkylsilyl) tetrasulfide in the absence of any other sulfur source in a non-productive rubber composition mixing stage at a temperature in a range of about 140° C. to about 180° C.

In the practice of the invention, the amount of sulfur, or sulfur releasable from a sulfur donor, introduced into the preparatory mixing is, generally, in a range of about 0.05 to about 2, alternatively about 0.2 to about 1. It is to be appreciated that the addition of the sulfur is in the sense of decoupling the silane reaction of the organosilane polysulfide with the reaction of free sulfur released from the polysulfide portion. This, according to the invention, is accomplished by utilizing a relatively high purity disulfide/ trisulfide version which does not appreciably release free sulfur under the prescribed conditions so that sulfur can be separately added in the preparatory mixing in the form, for example, as free sulfur or from a sulfur donor. In this sense, then, the contemplated amount of free sulfur which can be added in the preparatory mixing, in the practice of this invention, is, in general, somewhat comparable to the free sulfur which would have been generated from the organosilane polysulfide if it contained about 3–8 sulfur atoms in its sulfur bridge. While that actual calculation might be somewhat difficult to make since it would require an evaluation of the actual number sulfur atoms in the sulfur bridge, the range of sulfur added is more simply recited herein in terms of phr, or per hundred parts of rubber. This is believed to provide an appropriate amount of free sulfur addition for an organosilane polysulfide in which at least 55 to 75 percent of n is 2 and 5 to 35 percent of n is 3 in which at least 90 to 98 percent of the organosilane polysulfide is organosilane disulfide/trisulfide, all with only a minimal, if any, of n=4 and above. As hereinbefore discussed, a sulfur vulcanization accelerator which is not considered herein as being a sulfur donor, can also be added, even as an alternative to the said sulfur source, in the preparatory mixing for the process of this invention. The practitioner having ordinary skill in the rubber mixing art can readily optimize a sulfur source addition for the preparatory mixing to accommodate a desired mixing and processing condition and resultant rubber composition properties.

In the practice of this invention, said sulfur donor for said preparatory step(s) is selected from at least one of polysulfide vulcanization accelerator for sulfur vulcanizable elastomers and organosilane polysulfide with the polysulfide portion thereof composed of at least an average of at least three, and thus containing at least 4, connecting sulfur atoms.

For the said additionally added vulcanization accelerators as they may be referred to herein, it is appreciated that they may be, for example, of the type such as, for example, benzothiazole, alkyl thiuram disulfide, guanidine derivatives and thiocarbamates. Representative of such accelerators are, for example but not limited to, mercapto benzothiazole, tetramethyl thiuram disulfide, benzothiazole disulfide, diphenylguanidine, zinc dithiocarbamate, alkylphenoldisulfide, zinc butyl xanthate, N-dicyclohexyl-2-benzothiazolesulfenamide, N-cyclohexyl-2-benzothiazolesulfenamide, N-oxydiethylenebenzothiazole-2-sulfenamide, N,N diphenylthiourea, dithiocarbamylesulfenamide, N,N diisopropylbezothiozole-2-sulfenamide, zinc-2-mercmercaptotoluimidazole, dithiobis (N methyl piperazine), dithiobis(N beta hydroxy ethyl piperazine) and dithiobis(dibenzyl amine). Such materials are understood herein to be well known as sulfur vulcanization accelerators for sulfur vulcanizable elastomers to those having skill in the rubber compounding art.

For additional sulfur donors, it is to be appreciated that such donors may be, for example, of the type, for example, thiuram and morpholine derivatives. Representative of such donors are, for example, but not limited to, dimorpholine disulfide, dimorpholine tetrasulfide, tetramethyl thiuram tetrasulfide, benzothiazyl-2,N dithiomorpholide, thioplasts, dipentamethylenethiurahexasulfide, and disulfidecaprolactame. Such materials are understood to be well known sulfur donors to those having skill in the rubber compounding art.

For said additional sulfur donors, organosilane polysulfides with an average of at least three, usually at least 3.5 and, thus, a substantial and probably a majority portion thereof containing at least 4 connecting sulfur atoms in the polysulfide bridge may be used, representative examples thereof, but not limited to are those such as, for example, 3,3'-bis(trimethoxylsilylpropyl)tetrasulfide, 3,3'-bis (triethoxysilylpropyl)tetrasulfide, 3,3'-bis (triethoxysilylethyltolylene)tetrasulfide, and polysulfide organosilane T47 from Huels AG.

Where it is desired for the rubber composition, which contains both a silicious filler such as silica, alumina and/or aluminosilicates and also carbon black reinforcing pigments, to be primarily reinforced with silica as the reinforcing pigment, it is often preferable that the weight ratio of such silicious pigments silicates to carbon black is at least 3/1 and preferably at least 10/1 and, thus, in a range of about 3/1 to about 30/1.

In one aspect of the invention, it is preferred that the silicious pigment is precipitated silica.

In another aspect of the invention, the filler is comprised of about 15 to about 95 weight percent precipitated silica, alumina and/or aluminosilicate and, correspondingly, about 5 to about 85 weight percent carbon black; wherein the said carbon black has a CTAB value in a range of about 80 to about 150.

In a practice of this invention, said filler can be comprised of about 60 to about 95 weight percent of said silica, alumina and/or aluminosilicate and, correspondingly, about 40 to about 5 weight percent carbon black.

For the aforesaid organosilane disulfide/trisulfide profiled compound, representative $R^2$ radicals are alkyl radicals and representative $R^1$ radicals are selected from alkaryl, phenyl and haloaryl radicals.

Thus, in one aspect of the invention, the $R^2$ and $R^1$ radicals are mutually exclusive.

Representative examples of alkyl radicals are methyl, ethyl, n-propyl and n-decyl radicals.

Representative examples of aralkyl radicals are benzyl and alpha, alpha dimethylbenzyl radicals.

Representative examples of alkaryl radicals are p-tolyl and p-nonylphenol radicals.

A representative example of a haloaryl radical is a p-chlorophenol radical.

Representative examples of organosilane disulfides of the aforesaid high purity organosilane disulfide/trisulfide compound include, for example:
2,2'-bis(trimethoxysilylethyl)disulfide;
3,3'-bis(trimethoxysilylpropyl)disulfide;
3,3'-bis(triethoxysilylpropyl)disulfide;
2,2'-bis(triethoxysilylpropyl)disulfide;
2,2'-bis(tripropoxysilylethyl)disulfide;
2,2'-bi(tri-sec.butoxysilylethyl)disulfide;
3,3'-bis(tri-t-butoxyethyl)disulfide;
3,3'-bis(triethoxysilylethyl tolylene)disulfide;
3,3'-bis(trimethoxysilylethyl tolylene)disulfide;
3,3'-bis(triisopropoxypropyl)disulfide;
3,3,'-bis(trioctoxypropyl)disulfide;
2,2,'-bis(2'-ethylhexoxysilylethyl)disulfide;
2,2'-bis(dimethoxy ethoxysilylethyl)disulfide;
3,3,'-bis(methoxyethoxypropoxysilylpropyl)disulfide;
3,3'-bis(methoxy dimethylsilylpropyl)disulfide;
3,3'-bis(cyclohexoxy dimethylsilylpropyl)disulfide;
4,4'-bis(trimethoxysilylbutyl)disulfide;
3,3'bis(trimethoxysilyl-3-methylpropyl)disulfide;
3,3'-bis(tripropoxysilyl-3-methylpropyl)disulfide;
3,3'-bis(dimethoxy methylsilyl-3-ethylpropyl)disulfide;
3,3'-bis(trimethoxysilyl-2-methylpropyl)disulfide;
3,3'-bis(dimethoxyphenylsilyl-2-methylpropyl)disulfide;
3,3'-bis(trimethoxysilylcyclohexyl)disulfide;
12,12'-bis(trimethoxysilyldodecyl)disulfide;
12,12'-bis(triethoxysilyldodecyl)disulfide;
18,18'-bis(trimethoxysilyloctadecyl)disulfide;
18,18'-bis(methoxydimethylsilyloctadecyl)disulfide;
2,2-'-bistrimethoxysilyl-2-methylethyl)disulfide;
2,2'-bis(triethoxysilyl-2-methylethyl)disulfide;
2,2'-bis (tripropoxysilyl-2-methylethyl)disulfide; and
2,2'bis(trioctoxysilyl-2-methylethyl)disulfide.

In the practice of this invention, as hereinbefore pointed out, the rubber composition is comprised of at least one diene-based elastomer, or rubber. Suitable conjugated dienes are isoprene and 1,3-butadiene and suitable vinyl aromatic compounds are styrene and alpha methyl styrene. Thus, it is considered that the elastomer is a sulfur curable elastomer. Such diene based elastomer, or rubber, may be selected, for example, from at least one of cis 1,4-polyisoprene rubber (natural and/or synthetic), and preferably natural rubber), emulsion polymerization prepared styrene/butadiene copolymer rubber, organic solution polymerization prepared styrene/butadiene rubber, 3,4-polyisoprene rubber, isoprene/butadiene rubber, styrene/isoprene/butadiene terpolymer rubbers, cis 1,4-polybutadiene, medium vinyl polybutadiene rubber (35–50 percent vinyl), high vinyl polybutadiene rubber (50–75 percent vinyl), styrene/isoprene copolymers, emulsion polymerization prepared styrene/butadiene/ acrylonitrile terpolymer rubber and butadiene/acrylonitrile copolymer rubber.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

The relatively high styrene content of about 30 to about 45 for the E-SBR might be considered beneficial for a purpose of enhancing traction, or skid resistance, of the tire tread. The presence of the E-SBR itself is considered beneficial for a purpose of enhancing processability of the uncured elastomer composition mixture, especially in comparison to a utilization of a solution polymerization prepared SBR (S-SBR).

By emulsion polymerization prepared E-SBR, it is meant that styrene and 1,3-butadiene are copolymerized as an aqueous emulsion. Such are well known to those skilled in such art. The bound styrene content can vary, for example, from about 5 to 50%. In one aspect, the E-SBR may also contain acrylonitrile to form a terpolymer rubber, as E-SBR, in amounts, for example, of about 2 to about 30 weight percent bound acrylonitrile in the terpolymer.

Emulsion polymerization prepared styrene/butadiene/acrylonitrile terpolymer rubbers containing about 2 to about 40 weight percent bound acrylonitrile in the terpolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

A purpose of using S-SBR is for improved tire rolling resistance as a result of lower hysteresis when it is used in a tire tread composition.

The 3,4-polyisoprene rubber (3,4-PI) is considered beneficial for a purpose of enhancing the tire's traction when it is used in a tire tread composition.

The 3,4-polyisoprene elastomer and use thereof is more fully described in U.S. Pat. No. 5,087,668 which is incorporated herein by reference.

The cis 1,4-polybutadiene rubber is considered to be beneficial for a purpose of enhancing the tire tread's wear, or treadwear.

Such polybutadiene elastomer can be prepared, for example, by organic solution polymerization of 1,3-butadiene as is well known to those having skill in such art.

The polybutadiene elastomer may be conveniently characterized, for example, by having at least a 90% cis 1,4-content.

The cis 1,4-polyisoprene and cis 1,4-polyisoprene natural rubber are well known to those having skill in the rubber art.

The vulcanized rubber composition should contain a sufficient amount of silica, and carbon black if used, reinforcing filler(s) to contribute a reasonably high modulus and high resistance to tear. The combined weight of the silica, alumina, aluminosilicates and carbon black, as hereinbefore referenced, may be as low as about 30 parts per 100 parts rubber, but is more preferably from about 35 to about 90 parts by weight.

While it is considered herein that commonly employed siliceous pigments used in rubber compounding applications might be used as the silica in this invention, including pyrogenic and precipitated siliceous pigments (silica) alumina, aluminosilicates, precipitated silicas are preferred.

The siliceous pigments preferably employed in this invention are precipitated silicas such as, for example, those obtained by the acidification of a soluble silicate, e.g., sodium silicate. Such precipitated silicas are well known to those having skill in such art.

Such precipitated silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, page 304 (1930).

The silica may also be typically characterized by having a dibutylphthalate (DBP) absorption value in a range of about 100 to about 350, and more usually about 150 to about 300.

Further, the silica, as well as the aforesaid alumina and aluminosilicate may be expected to have a CTAB surface area in a range of about 100 to about 220. The CTAB surface area is the external surface area as evaluated by cetyl trimethylammonium bromide with a pH of 9. The method is described in ASTM D 3849 for set up and evaluation. The CTAB surface area is a well known means for characterization of silica.

Mercury surface area/porosity is the specific surface area determined by Mercury porosimetry. For such technique, mercury is penetrated into the pores of the sample after a thermal treatment to remove volatiles. Set up conditions may be suitably described as using a 100 mg sample; removing volatiles during 2 hours at 105° C. and ambient atmospheric pressure; ambient to 2000 bars pressure measuring range. Such evaluation may be performed according to the method described in Winslow, Shapiro in ASTM bulletin, p.39 (1959) or according to DIN 66133. For such an evaluation, a CARLO-ERBA Porosimeter 2000 might be used.

The average mercury porosity specific surface area for the silica should be in a range of about 100 to 300 $m^2/g$.

A suitable pore size distribution for the silica, alumina and aluminosilicate according to such mercury porosity evaluation is considered herein to be:

five percent or less of its pores have a diameter of less than about 10 nm; 60 to 90 percent of its pores have a diameter of about 10 to about 100 nm; 10 to 30 percent of its pores have a diameter of about 100 to about 1000 nm; and 5 to 20 percent of its pores have a diameter of greater than about 1000 nm.

The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations Hi-Sil 210, 243, etc; silicas available from Rhone-Poulenc, with, for example, designation of Zeosil 1165MP, silicas available from Degussa GmbH with, for example, designations VN2 and VN3, etc and silicas commercially available from Huber having, for example, a designation of Hubersil 8745.

Representative examples of alumina for the purposes of this invention are natural and synthetic aluminum oxide ($Al_2O_3$). Such alumina can be suitably synthetically prepared, for example, by controlled precipitation of aluminum hydroxide. For example, neutral, acidic, and basic $Al_2O_3$ can be obtained from the Aldrich Chemical Company. In the practice of this invention, the neutral alumina is preferred, however, it is considered herein that the acidic, basic and neutral forms of alumina could be used. The neutral, or substantially neutral form is indicated as being preferential in order to use a form with reduced number of surface —OH groups as compared to the acidic form and, also, to reduce the basic sites of the alumina which are AlO-ions, representing a strong base, in order to reduce potential interferences with the desired reactions of the alumina with the organosilane disulfide coupler.

Representative examples of aluminosilicates for the purposes of this invention are, for example but not intended to be limited to, Sepiolite as a natural aluminosilicate which might be obtained as PANSIL from Tolsa S. A., Toledo, Spain and SILTEG as a synthetic aluminosilicate from Degussa GmbH. Such aluminosilicates can be used as natural materials or synthetically prepared, for example, as hereinbefore exemplified.

It is readily understood by those having skill in the art that the rubber composition would be compounded by methods generally known in the rubber compounding art, such as mixing the various sulfur vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typical amounts of reinforcing type carbon blacks(s), for this invention, if used, are hereinbefore set forth. It is to be appreciated that the silica coupler may be used in conjunction with a carbon black, namely, pre-mixed with a carbon black prior to addition to the rubber composition, and such carbon black is to be included in the aforesaid amount of carbon black for the rubber composition formulation. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), pages 344–346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include, for example, elemental sulfur (free sulfur) or sulfur donating vulcanizing agents, for example, an amine disulfide, polymeric polysulfide or sulfur olefin adducts which are conventionally added in the final, productive, rubber composition mixing step. Preferably, in most cases, the sulfur vulcanizing agent is elemental sulfur. As known to those skilled in the art, sulfur vulcanizing agents are used, or added in the productive mixing stage, in an amount ranging from about 0.4 to about 3 phr, or even, in some circumstances, up to about 8 phr, with a range of from about 1.5 to about 2.5, sometimes from 2 to 2.5, being usually preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 1.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The rubber composition of this invention can be used for various purposes. For example, it can be used for various tire compounds. Such tires can be built, shaped, molded and cured by various methods which are known and will be readily apparent to those having skill in such art.

The invention may be better understood by reference to the following examples in which the parts and percentages are by weight unless otherwise indicated.

EXAMPLE I

Sulfur vulcanizable rubber mixtures containing silica reinforcement were prepared utilizing, individually, both a 3,3-bis(triethoxysilylpropyl)tetrasulfide and by utilizing a high purity 3,3-bis(triethoxysilylpropyl)disulfide.

It is believed that said organosilane tetrasulfide sulfur bridge portion contains an average of about 3.5 to about 4 connecting sulfur atoms, with a range of about 2 to 6 or 8 connecting sulfur atoms, and with not more than 25 percent of its sulfur bridge portion having 2 or less connecting sulfur atoms.

The said organosilane polysulfide and the high purity organosilane disulfide were mixed with the elastomer(s) and compounding ingredients in a sequential step-wise manner in a series of preparatory mix stages.

For the use of the high purity 3,3-bis(triethoxysilylpropyl) disulfide, a small amount of free sulfur is also added in the first preparatory mix stage. In the final mix stage additional and a more quantitative amount of free sulfur is added together with sulfur vulcanization accelerators.

After each mixing step the rubber mixture was batched off on a mill, mill mixed for a short period of time, and slabs of rubber removed from the mill and allowed to cool to a temperature of about 30° C. or lower.

Rubber compositions containing the materials set out in Table 1 were prepared in a BR Banbury mixer using three separate stages of addition (mixing), namely, two preparatory mix stages and one final mix stage to temperatures of 160° C., 160° C. and 120° C. and times of about 8 minutes, 2 minutes and 2 minutes, respectively for the three overall mix stages. The amounts of the organosilane tetrasulfide, organosilane disulfide and free, elemental sulfur are listed as being "variable" in Table 1 and are more specifically set forth in Table 2.

Samples 2 and 3, which used the high purity organosilane disulfide, when compared to Sample 1 which used the organosilane polysulfide, clearly show the advantage of using the high purity organosilane disulfide in combination with the free sulfur addition as a means to control the mixing process for the silica reinforced elastomer.

TABLE 1

| 1st Preparatory Mixing Stage | |
|---|---|
| Elastomer[1] | 100 |
| Processing Oil | 14 |
| Antioxidant[2] | 10 |
| Silica[3] | 83 |
| Bis-(3-triethoxysilylpropyl)tetrasulfide[4] | variable |
| Organosilane disulfide | variable |
| Sulfur[5] | variable |
| Final Mixing Stage | |
| Sulfur[5] | 1.4 |
| Accelerator, sulfenamide type | 1.6 |
| ZnO | 3 |
| Fatty Acid | 2 |

1) a combination of elastomers, namely, cis 1,4-polyisoprene natural rubber, E-SBR obtained from The Goodyear Tire & Rubber Company containing about 40 percent styrene and having a Tg of about −31° C., isoprene/butadiene (50/50) copolymer elastomers having a Tg of about −44° C. obtained from The Goodyear Tire & Rubber Company, and cis 1,4-polybutadiene elastomer obtained as BUD 1207 from The Goodyear Tire & Rubber Company, in a dry rubber weight weight ratio of 10/25/45/20; with the E-SBR being oil extended so that it contains 25 phr rubber and 15 phr oil;
2) a phenylene diamine type;
3) Zeosil 1165 MP from Rhone Poulenc;
4) a composite commercially available from Degussa GmbH as X50S in a form of a 50/50 blend of Si69, or what might be referred to as bis-(3-triethoxysilylpropyl)tetrasulfide as hereinbefore described in this specification, (said tetrasulfide also available from Degussa GmbH as Si69), with carbon black and, thus, the tetrasulfide is considered as being 50% of the composite and, therefore, 50% active; and
5) obtained as an $S_8$ elemental sulfur from the Kali Chemie company of Germany.

The high purity organosilane disulfide can be suitably prepared, for example, by oxidation of mercapto propyltriethoxysilane on manganese dioxide under conditions such as adding 500 parts by weight of the mercaptosilane to about 320 parts by weight of manganese dioxide and the mixture shaken vigorously. The reaction initially takes place at about room temperature, or about 23° C., which then rises to about 90° C. due to the exothermic reaction process. About 500 parts by weight of dry toluene are then added. The mixture is allowed to continue to react at about 50° C. for about an hour. Manganese dioxide is then removed by filtration and the remaining organic phase is filtered.

The purity of the organosilane disulfide was determined to be at least 98 percent by weight. Thus, for the organosilane polysulfide compound used in the process for this Example, the value for at least 98 percent of n was 2. The purity was measured by NMR (nuclear magnetic resonance verified and by (i) GC-MS, or gas chromatography mass spectrometry, and (ii) HPLC, or high performance liquid chromatography.

TABLE 2

| Sample # | Ex 1 | Ex 2 | Ex 3 |
|---|---|---|---|
| Bis-(3-triethoxysilyl-propyl)tetrasulfide | 13.6 | | |
| Organosilane disulfide | | 10 | 8 |
| Sulfur[1] | | | 0.87 |
| Mooney NP1[2] | 113 | 100 | 104 |
| Mooney NP2[3] | 97 | 89 | 95 |
| Mooney P[4] | 53 | 47 | 51 |
| Mooney Peak Value[5] (NP1) | 130 | 115 | 119 |
| Rheometer (150° C.) | | | |
| Max. Torque (DN.M) | 14.2 | 12.3 | 14.2 |
| Min. Torque (DN.M) | 3.2 | 2.3 | 3.7 |
| Delta Torque (DN.M) | 11 | 10 | 11.2 |
| $T_{90}$, minutes | 5.5 | 4.1 | 4.7 |
| Stress-Strain | | | |
| Tensile Strength, MPa | 16 | 17.2 | 17 |
| Elongation at Break, % | 411 | 532 | 453 |
| 100% Modulus, MPa | 1.87 | 1.6 | 1.6 |
| 300% Modulus, MPa | 10.9 | 7.8 | 10.7 |
| Rebound | | | |
| 100° C., % | 68.4 | 63.4 | 67.2 |
| Hardness | | | |
| 25° C. | 60 | 67.3 | 63.2 |
| Dynaliser | | | |
| Tan. Delta at 60° C. | 0.079 | 0.100 | 0.080 |
| DIN Abrasion | 87 | 65 | 81 |

1) sulfur added in the preparatory, non-productive mix stage;
2,3,4) Mooney viscosity (ML-4) of the rubber mixture from the non-productive mix stage No. 1 and No. 2 (NP1 and NP2) and productive mix stage (P), respectively; and
5) the Mooney (ML-4) peak value for the rubber mixture from the NP1 mix stage means the maximum Mooney value determined from the Mooney curve plotted as Mooney versus time.

In particular, this Example shows that high purity organosilane disulfide plus the controlled addition of a very small amount of free sulfur, namely, in an amount similar to the estimated free sulfur that would have been generated in the mixing step if the organosilane tetrasulfide had been used (Ex. 3), provides a rubber composition with properties somewhat similar to the properties of the rubber composition of Ex. 1 which utilized the organosilane tetrasulfide.

This Example further shows that controlling the amount of free sulfur in the non-productive rubber mix stage is beneficial to the rubber compound processing control at equivalent properties as particularly evidenced by Ex. 1 versus Ex. 3. In one aspect, the DIN Abrasion property of Ex. 2 is significantly lower than that of both Ex. 1 and Ex. 3. While this may be considered an advantage in using the organosilane disulfide without the controlled addition of the free sulfur because such property is sometime considered indicative of tire treadwear. Nevertheless the utilization of the free sulfur in the rubber mixture of Ex.3. is still considered an advantage because tire rolling resistance property is considered to be improved as demonstrated by the hot rebound and tan.delta values.

In addition, the Mooney plasticity values, as a measure of the viscosity of the rubber mixture, emphasizes the advantage of using disulfide without the free sulfur addition as compared to using the organosilane tetrasulfide as far as compound processing is concerned as demonstrated by the Mooney values shown in Table 2 and particularly the Mooney peak values of the rubber from the non-productive mix stages with the values being progressively greater from Ex. 2 to Ex. 3 to Ex. 1.

Accordingly, it is considered herein that it has been demonstrated that, in the mixing of sulfur vulcanizable elastomer, silica, and organosilane polysulfide coupler at an elevated temperature, a method has been provided for decoupling (i) the formation of a covalent bond between the organosilane polysulfide and the elastomer (the aforesaid second reaction) from (ii) the sulfur donating effect (the aforesaid third reaction).

EXAMPLE II

Tires of size 195/65R15 were prepared using the rubber compositions of Exs. 1, 2 and 3 for the treads thereof. The following results were obtained as shown in Table 3:

TABLE 3

|  | Ex. 1 | Ex. 2 | Ex. 3 |
| --- | --- | --- | --- |
| Rolling Resistance | 100 | 96 | 100 |
| High Speed[1] Km/h | 2'46"/270 | 3'07"/280 | 8'15"/270 |
| Treadwear | 100 | 111 | 101 |
| Wet skid on asphalt | 100 | 105 | 99 |
| Wet skid on concrete | 100 | 103 | 103 |

1) The high speed values are given, for example, using the reported values for Ex. 3 as 8'15"/270 which means that the tire withstands 8 minutes and 15 seconds at 270 km/hr of equivalent vehicular speed (not rotational speed) on a suitable dynamometer.

This Example demonstrates that a tire with a tread of the rubber composition of Ex. 3 was observed to provide tire rolling resistance and treadwear similar to the tire with tread of the rubber composition of Ex. 1.

The utilization of a tire with tread of Ex.3. is considered herein to be an advantage because it shows the best balance of properties, namely, wet skid, treadwear and rolling resistance at improved unvulcanized compound processing compared to Ex. 1 even though Ex. 2 did indicate a higher treadwear and better wet skid on asphalt values.

Additional Disclosure and Practice of the Invention

EXAMPLE III

Sulfur vulcanizable rubber mixtures containing silica reinforcement were prepared utilizing individually, (i) a 3,3-bis(triethoxysilylpropyl)tetrasulfide as in Example I, (ii) a high purity (98%) 3,3-bis(triethoxysilylpropyl)disulfide as in Example I, and (iii) a high purity 3,3-bis (triethoxysilylpropyl) profiled disulfide/trisulfide which contained less than 10 percent tetrasulfide in its polysulfidic bridge.

It is understood that the tetrasulfide sulfur bridge portion of said tetrasulfide (i) contains an average of about 3.5 to about 4 connecting sulfur atoms, with a range of about 2 to 6 or up to 8 connecting sulfur atoms, and with less than about 20 percent of its sulfur bridge portion having 2 or less connecting sulfur atoms with a major portion of the polysulfide bridge containing 4 or more sulfur atoms and with less than about 50 percent of its sulfur bridge portion having a combination of 2 and 3 connecting sulfur atoms.

The said organosilane tetrasulfide (i) high purity disulfide (ii) high purity organosilane and the disulfide/trisulfide (iii) were individually mixed with the elastomer(s) and compounding ingredients in a sequential step-wise manner in a series of preparatory mix stages.

After each mixing step the rubber mixture was batched off on a mill, mill mixed for a short period of time, and slabs of rubber removed from the mill and allowed to cool to a temperature of about 30° C. or lower.

Rubber compositions containing the materials set out in Table 4 were prepared in a BR Banbury mixer using three separate stages of addition (mixing), namely, two preparatory mix stages and one final mix stage to temperatures of 160° C., 160° C. and 120° C. and times of about 8 minutes, 2 minutes and 2 minutes, respectively for the three overall mix stages. The amounts of the organosilane tetrasulfide, organosilane disulfide and free, elemental sulfur are listed as being "variable" in Table 4 and are more specifically set forth in Table 5.

Sample Ex. 5, which used the high purity organosilane disulfide, and Sample Ex. 6 which used the high purity organosilane profiled disulfide/trisulfide when compared to Sample Ex. 4 which used the organosilane tetrasulfide, clearly show the use of the high purity organosilane profiled disulfide/trisulfide in combination with the free sulfur addition to prepare a rubber composition having comparable physical properties to both the rubber composition prepared (i) with the tetrasulfide without free sulfur addition and (ii) with the high purity disulfide with the free sulfur addition without the processing disadvantages such as a high Mooney viscosity and high Mooney peak value for the composition utilizing the tetrasulfide and the high cost of the organosilane coupling agent for the composition utilizing the high purity disulfide.

TABLE 4

| 1st Preparatory Mixing Stage | |
| --- | --- |
| Elastomer[1] | 100 |
| Processing Oil | 14 |
| Antioxidant[2] | 10 |
| Silica[3] | 83 |
| Bis-(3-triethoxysilylpropyl) tetrasulfide[4] | variable |
| Organosilane disulfide[5] | variable |
| Organosilane disulfide/trisulfide[6] | variable |
| Sulfur[7] | variable |
| Final Mixing Stage | |
| Sulfur[7] | 1.4 |
| Accelerator, sulfenamide type | 1.6 |
| ZnO | 3 |
| Fatty Acid | 2 |

1) a combination of elastomers, namely, cis 1,4-polyisoprene natural rubber, E-SBR obtained from The Goodyear Tire & Rubber Company containing about 40 percent styrene and having a Tg of about −31° C., isoprene/butadiene (50/50) copolymer elastomers having a Tg of about −44° C. obtained from The Goodyear Tire & Rubber Company, and cis 1,4-polybutadiene elastomer obtained as BUD 1207 from The Goodyear Tire & Rubber Company, in a dry rubber weight ratio of 10/25/45/20; with the E-SBR bieng oil extended so that it contains 25 phr rubber and 15 phr oil;
2) a phenylene diamine type;
3) Zeosil 1165 MP from Rhone Poulenc;
4) a composite commercially available from Degussa GmbH as X50S in a form of a 50/50 blend of Si69, or what might be referred to as bis-(3-triethoxysilylpropyl)tetrasulfide as hereinbefore described in this specification, (said tetrasulfide also available from Degussa GmbH as Si69), with carbon black and, thus, the tetrasulfide is considered as being 50% of the composite and, therefore, 50% active;
5) a high purity 3,3-bis(triethoxysilylpropyl) disulfide in which n = 2 is about 98 percent;
6) a high purity 3,3-bis(triethoxysilylpropyl) profiled disulfide/trisulfide in which n = 2 is about 75 percent, n = 3 is about 23 percent and n = 4 is about 2 percent of n, so that the sum of n = 2 and n = 3 is about 98 percent of n;
7) obtained as an $S_8$ elemental sulfur from the Kali Chemie company of Germany.

The relatively high purity organosilane profiled disulfide/trisulfide can be suitably prepared, for example, by a phase transfer catalyst process which might be exemplified, for example, by U.S. Pat. Nos. 5,405,985 and 5,468,893.

The purity of the organosilane profiled disulfide/trisulfide, insofar as the value of n in concerned might be measured by NMR (nuclear magnetic resonance verified and by (i) GC-MS, or gas chromatography mass spectrometry, and (ii) HPLC, or high performance liquid chromatography.

TABLE 5

| Sample # | Ex. 4 | Ex. 5 | Ex. 6 |
|---|---|---|---|
| Bis-(3-triethoxysilyl-propyl)tetrasulfide | 13.6 | | |
| Organosilane disulfide | | 8 | 8 |
| Sulfur[1] | | 0.6 | 0.6 |
| Mooney NP1[2] | 113 | 104 | 105 |
| Mooney NP2[3] | 97 | 92 | 93 |
| Mooney P[4] | 53 | 49 | 48 |
| Mooney Peak Value[5] (NP1) | 130 | 120 | 118 |
| Rheometer (150° C.) | | | |
| Max. Torque (DN.M) | 14.2 | 14.3 | 14.2 |
| Min. Torque (DN.M) | 3.2 | 3.0 | 3.5 |
| Delta Torque (DN.M) | 11 | 10.4 | 10.8 |
| $T_{90}$, minutes | 5.5 | 4.5 | 4.8 |
| Stress-Strain | | | |
| Tensile Strength, MPa | 16 | 17.6 | 17.2 |
| Elongation at Break, % | 411 | 520 | 480 |
| 100% Modulus, MPa | 1.87 | 1.6 | 1.65 |
| 300% Modulus, MPa | 10.9 | 10.3 | 10.5 |
| Rebound | | | |
| 100° C., % | 68.4 | 67.5 | 65.0 |
| Hardness | | | |
| 25° C. | 60.0 | 65.0 | 63.0 |
| Dynaliser | | | |
| Tan. Delta at 60° C. | 0.079 | 0.070 | 0.068 |
| DIN Abrasion | 87 | 75 | 77 |

1) sulfur added in the preparatory, non-productive mix stage;
2,3,4) Mooney viscosity (ML-4) of the rubber mixture from the non-productive mix stage No. 1 and No. 2 (NP1 and NP2) and productive mix stage (P), respectively; and
5) the Mooney (ML-4) peak value for the rubber mixture from the NP1 mix stage means the maximum Mooney value determined from the Mooney curve plotted as Mooney versus time.

In particular, this Example shows that the relatively high purity organosilane disulfide/trisulfide plus the controlled addition of a very small amount of free sulfur, namely, in an amount similar to the estimated free sulfur that would have been generated in the mixing step if the organosilane tetrasulfide had been used (Ex. 6), provides a rubber composition with properties somewhat similar to the properties of the rubber composition of Ex. 4 which utilized the organosilane tetrasulfide and Ex. 5 which utilized a high purity disulfide. In addition, the processing advantages observed in Ex. 5 are maintained in Ex. 6 (mooney viscosity data). Accordingly, it has been demonstrated that it is possible to use a relatively high purity profiled disulfide/trisulfide organosilane to match the processing and the properties of a high purity disulfide while optimizing the cost. The production cost of a high purity profiled disulfide/trisulfide organosilane (Ex. 6) being substantially lower than those required to produce the very high purity disulfide (Ex. 5).

EXAMPLE IV

Tires of size 195/65R15 are prepared using the rubber compositions of Exs. 4, 5 and 6 for the treads thereof. The results obtained are shown in Table 6. This Example demonstrates that a tread of rubber composition represented by Ex. 6 provided tire results similar to a tire with tread represented by Ex. 5.

TABLE 6

| | Ex. 4 | Ex. 5 | Ex. 6 |
|---|---|---|---|
| Rolling resistance | 100 | 100 | 101 |
| High speed | 2'46"/270 | 5'10"/280 | 4'35"/270 |
| Treadwear | 100 | 104 | 101 |
| Wet skid on asphalt | 100 | 103 | 104 |
| Wet skid on concrete | 100 | 102 | 103 |

While certain representative embodiments and details have been shown for the purpose of illustrating the invention, it will be apparent to those skilled in this art that various changes and modifications may be made therein without departing from the spirit or scope of the invention.

What is claimed is:

1. A process of preparing a rubber composition which comprises the sequential steps of:
   (A) thermomechanically mixing in at least one preparatory mixing step to a temperature of about 140° C. to about 190° C. for a total mixing time of about 2 to about 20 minutes (i) 100 parts by weight of at least one sulfur vulcanizable elastomer selected from conjugated diene homopolymers and copolymers and copolymers of at least one conjugated diene and aromatic vinyl compound, (ii) about 15 to about 100 phr of particulate filler comprised of at least one of precipitated silica, alumina, aluminosilicate and carbon black, wherein said filler contains from about 5 to about to 85 weight percent carbon black, (iii) about 0.05 to about 20 parts by weight per part by weight of said particulate filler of at least one organosilane disulfide/trisulfide compound having the formula:

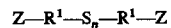

$$Z-R^1-S_n-R^1-Z$$

wherein n is an integer of from 2 to 6 provided, however, that about 55 to about 75 percent of n is 2, about 15 to about 35 percent of n is 3 and about 2 to about 10 percent of n is 4, and less than 10 percent of n is greater than 4 provided that the sum of n=2 and n=3 is in a range of about 90 to about 98 percent of n;

wherein Z is selected from the group consisting of:

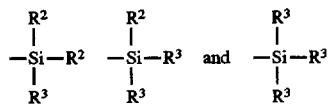

wherein $R^2$ may be the same or different and is individually selected from the group consisting of alkyl group having 1 to 4 carbons and phenyl; $R^3$ may be the same or different and is individually selected from the group consisting of alkyl groups having 1 to 4 carbon atoms, phenyl, alkoxy groups having 1 to 8 carbon atoms and cycloalkoxy groups with 5 to 8 carbon atoms; and $R^1$ is selected from the group consisting of a substituted or unsubstituted alkylene group having a total of 1 to 18 carbon atoms and a substituted or unsubstituted arylene group having a total of 6 to 12 carbon atoms;

(iv) at least one additional additive as a compound selected from (a) a free sulfur source selected from at least one of (1) elemental sulfur and (2) at least one sulfur donor as a polysulfidic organic compound containing sulfur and having a property of releasing at least a portion of said sulfur at a temperature in a range of about 140° C. to about 190° C.; provided, however, that the total free sulfur from said elemental sulfur addition and available from said sulfur donor addition is in a range of about 0.05 to about 2 phr, and (b) about 0.1 to about 0.5 phr of at least one vulcanization accelerator for sulfur vulcanizable elastomers that is not a such a sulfur donor; and (B) subsequently blending therewith, in a final thermomechanical mixing step at a temperature to about 100° C. to about 130° C. for a time of about 1 to about 3 minutes, about 0.4 to about 3 phr of elemental sulfur provided, however that the total of elemental and/or free sulfur introduced in said preparatory mixing steps and elemental sulfur added in said final mixing step is in a range of about 0.45 to about 5 phr, and at least one sulfur vulcanization accelerator.

2. The process of claim 1 in which a total of about 0.05 to about 5 phr of at least one alkyl silane is added to said preparatory thermomechanical mixing step(s), wherein said alkyl silane has the formula: R'—Si—(OR)$_3$, where R is a methyl, ethyl, propyl or isopropyl radical and R' is a saturated alkyl having from 1 to 18 carbon atoms or aryl or saturated alkyl substituted aryl radical having from 6 to 12 carbon atoms.

3. The process of claim 2 wherein said alkyl silane is selected from one or more of propyltriethoxy silane, methyltriethoxy silane, hexadecyltriethoxy silane and octadecyltriethoxy silane.

4. The process of claim 1 wherein said preparatory mixing is conducted in at least two thermomechanical mixing steps, wherein at least two of such mixing steps are to a temperature of about 140° C. to about 190° C., with intermediate cooling of the rubber composition between at least two of the said mixing steps to a temperature below about 50° C.

5. The process of claim 1 which comprises the additional step of vulcanizing the prepared rubber composition at a temperature in a range of from about 140° C. to about 190° C.

6. A vulcanized rubber composition prepared according to the process of claim 5.

7. The process of claim 1 which comprises the additional steps of preparing an assembly of a tire of sulfur vulcanizable rubber with a tread comprised of the said rubber composition and vulcanizing the assembly at a temperature in a range of about 140° C. to about 190° C.

8. A vulcanized rubber tire prepared according to the process of claim 7.

9. The process of claim 4 which comprises the additional step of vulcanizing the prepared rubber composition at a temperature in a range of from about 140° C. to about 190°. C.

10. A vulcanized rubber composition prepared according to the process of claim 9.

11. The process of claim 4 which comprises the additional steps of preparing an assembly of a tire of sulfur vulcanizable rubber with a tread comprised of the said rubber composition and vulcanizing the assembly at a temperature in a range of about 140° C. to about 190° C.

12. A vulcanized rubber tire prepared according to the process of claim 11.

13. The process of claim 1 where, for said sulfur vulcanizable elastomer, said conjugated dienes are selected from isoprene and 1,3-butadiene and said vinyl aromatic compounds are selected from styrene and alpha methyl styrene.

14. The process of claim 1 where said sulfur vulcanizable elastomer is selected from at least one of natural and synthetic cis 1,4-polyisoprene rubber, emulsion polymerization prepared styrene/butadiene copolymer rubber, organic solution polymerization prepared styrene/butadiene copolymer rubber, 3,4-polyisoprene rubber, isoprene/butadiene rubber, styrene/isoprene/butadiene terpolymer rubbers, cis 1,4-polybutadiene rubber, medium vinyl polybutadiene rubber (35–50 percent vinyl), high vinyl polybutadiene (50–75 percent vinyl) and emulsion polymerization prepared styrene/butadiene/acrylonitrile terpolymer rubber and butadiene/acrylonitrile copolymer rubber.

15. The process of claim 1 wherein the silica is characterized by having a BET surface area in a range of about 100 to about 300 square meters per gram and a dibutylphthalate (DBP) absorption value in a range of about 150 to about 350, a CTAB value in a range of about 100 to about 220, and a mercury porosimetry pore size distribution of: five percent less of its pores with a diameter of less than about 10 nm; 60 to 90 percent of its pores with a diameter of about 10 to about 100 nm; 10 to 30 percent of its pores with a diameter of about 100 to about 1000 nm and 5 to 20 percent of its pores with a diameter of greater than about 1000 nm.

16. The process according to claim 15 in which said filler is comprised of about 15 to about 95 weight percent precipitated silica and, correspondingly, from 5 to about 85 weight percent carbon black; wherein said carbon black is has a CTAB value in a range of about 80 to about 150.

17. The process according to claim 16 wherein the filler is comprised of about 60 to about 95 weight percent silica and, correspondingly, about 40 to about 5 weight percent carbon black.

18. The process of claim 1 wherein said filler is comprised of about 15 to about 100 weight percent alumina and, correspondingly, from 5 to about 85 weight percent carbon black; wherein said carbon black has a CTAB value in a range of about 80 to about 150 and said alumina has a CTAB value in a range of about 100 to about 220 and a mercury porosimetry pore size distribution of: five percent less of its pores with a diameter of less than about 10 nm; 60 to 90 percent of its pores with a diameter of about 10 to about 100 nm; 10 to 30 percent of its pores with a diameter of about 100 to about 1000 nm and 5 to 20 percent of its pores with a diameter of greater than about 1000 nm.

19. The process according to of claim 18 wherein said filler is comprised of about 60 to about 95 weight percent alumina and, correspondingly, about 40 to about 5 weight percent carbon black.

20. The process of claim 1 wherein said filler is comprised of about 15 to about 100 weight percent aluminosilicate and, correspondingly, from about 5 to about 85 weight percent carbon black; wherein said carbon black has a CTAB in a range of about 80 to about 150 and wherein said aluminosilicate has a CTAB value in a range of about 100 to about 220 and a mercury porosimetry pore size distribution of: five percent less of its pores with a diameter of less than about 10 nm; 60 to 90 percent of its pores with a diameter of about 10 to about 100 nm; 10 to 30 percent of its pores with a diameter of about 100 to about 1000 nm and 5 to 20 percent of its pores with a diameter of greater than about 1000 nm.

21. The process according to claim 20 wherein said filler is comprised of about 60 to about 95 weight percent aluminosilicate and, correspondingly, about 40 to about 5 weight percent carbon black.

22. The process of claim 1 where said aluminosilicate is selected from at least one of at least one of (a) natural aluminosilicates selected from Muscovite, Beryl, Dichroite, Sepiolite and Kaolinite and (b) synthetic aluminosilicates prepared by (i) co-precipitation by pH adjustment of a basic solution, or mixture of silicate and aluminate or by (ii) a chemical reaction between silanols at the surface of a silicon dioxide and NaAlO$_2$.

23. The process according to claim 22 where for said synthetic co-precipitated aluminosilicate about 5 to about 95 percent of its surface is composed of silica moieties and, correspondingly, about 95 to about 5 percent of its surface is composed of aluminum moieties.

24. The process according to claim 20 wherein said synthetic aluminosilicate is represented by the formula:

[(Al$_2$O$_3$)$_x$.(SiO$_2$)$_y$. MO]; where M is magnesium or calcium.

25. The process of claim 1 wherein said sulfur donor additional additive is selected from at least one of dimorpholine tetrasulfide, tetramethyl thiuram tetrasulfide, benzothiazyl-2,N dithiomorpholide, thioplasts, dipentamethylenethiuramhexasulfide and disulfidecaprolactame.

26. The process of claim 1 wherein said vulcanization accelerator for sulfur vulcanizable elastomers additional additive is selected from at least one of mercaptobenzothiazole, tetramethyl thiuram disulfide, benzothiazole disulfide, diphenylguanidine, zinc dithiocarbamate, alkylphenoldisulfide, zinc butyl xanthate, N-dicyclohexyl-2-benzothiazolesulfenamide, N-cyclohexyl-2-benzothiazolesulfenamide, N-oxydiethylenebenzothiazole-2-sulfenamide, N,N diphenylthiourea, dithiocarbamylesulfenamide, N,N diisopropylbezothiozole-2-sulfenamide, zinc-2-mercaptotoluimidazole, dithiobis (N methyl piperazine), dithiobis(N beta hydroxy ethyl piperazine) and dithiobis (dibenzyl amine).

27. The process of claim 1 wherein said sulfur donor additional additive is selected from at least one of 3,3'-bis (trimethoxysilylpropyl)tetrasulfide; 3,3'-bis (triethoxysilylpropyl)tetrasulfide; 3,3'-bis (triethoxysilylethyl tolylene)tetrasulfide; and 3,3'-bis (trimethoxysilylethyl tolylene)tetrasulfide.

28. The process of claim 1 wherein for the said organosilane polysulfide compound, said R$^2$ radicals are alkyl radicals and said R$^1$ radicals are selected from alkaryl, phenyl and haloaryl radicals.

29. The process according to claim 28 wherein said alkyl radicals are selected from methyl, ethyl, n-propyl and n-decyl radicals; said aralkyl radicals are selected from benzyl and alpha, alpha dimethylbenzyl radicals; said alkaryl radicals are selected from p-tolyl and p-nonylphenol radicals; and said haloaryl radical is a p-chlorophenol radical.

30. The process of claim 1 wherein organosilane disulfides of said organosilane disulfide/trisulfide compounds are selected from at least one of:
2,2'-bis(trimethoxysilylethyl)disulfide;
3,3'-bis(trimethoxysilylpropyl)disulfide;
3,3'-bis(triethoxysilylpropyl)disulfide;
2,2'-bis(triethoxysilylpropyl)disulfide;
2,2'-bis(tripropoxysilylethyl)disulfide;
2,2'-bi(tri-sec.butoxysilylethyl)disulfide;
3,3'-bis(tri-t-butoxyethyl)disulfide;
3,3'-bis(triethoxysilylethyl tolylene)disulfide;
3,3'-bis(trimethoxysilylethyl tolylene)disulfide;
3,3'-bis(triisopropoxypropyl)disulfide;
3,3'bis(trioctoxypropyl)disulfide;
2,2'bis(2,'-ethylhexoxysilylethyl)disulfide;
2,2'-bis(dimethoxy ethoxysilylethyl)disulfide;
3,3'-bis(methoxyethoxypropoxysilylpropyl)disulfide;
3,3'-bis(methoxy dimethylsilylpropyl)disulfide;
3,3'-bis(cyclohexoxy dimethylsilylpropyl)disulfide;
4,4'-bis(trimethoxysilylbutyl)disulfide;
3,3'-bis(trimethoxysilyl-3-methylpropyl)disulfide;
3,3'-bis(tripropoxysilyl-3-methylpropyl)disulfide;
3,3'-bis(dimethoxy methylsilyl-3-ethylpropyl)disulfide;
3,3'-bis(trimethoxysilyl-2-methylpropyl)disulfide;
3,3'-bis(dimethoxyphenylsilyl-2-methylpropyl)disulfide;
3,3'-bis(trimethoxysilylcyclohexyl)disulfide;
12,12'-bis(trimethoxysilyldodecyl)disulfide;
12,12'-bis(triethoxysilyldodecyl)disulfide;
18,18'-bis(trimethoxysilyloctadecyl)disulfide;
18,18'-bis(methoxydimethylsilyloctadecyl)disulfide;
2,2-'-bis(trimethoxysilyl-2-methylethyl)disulfide;
2,2'bis(triethoxysilyl-2-methylethyl)disulfide;
2,2'-bis(tripropoxysilyl-2-methylethyl)disulfide; and
2,2'-bis(trioctoxysilyl-2-methylethyl)disulfide.

31. The process of claim 1 where organosilane disulfides of said organosilane disulfide/trisulfide compounds are selected from at least one of:
3,3'-bis(trimethoxysilylpropyl)disulfide;
3,3'-bis(triethoxysilylpropyl)disulfide;
3,3'-bis(triethoxysilylethyl tolylene)disulfide; and
3,3'-bis(trimethoxysilylethyl tolylene)disulfide.

32. The process of claim 1 where, for said organosilane polysulfide, at least 95 percent of n is 2; where said R$^2$ radicals are alkyl radicals selected from methyl, ethyl, n-propyl and n-decyl radicals; and where said R$^1$ radicals are selected from benzyl, alpha, alpha dimethylbenzyl, p-tolyl, p-nonylphenol and p-chlorophenol radicals.

33. The process according to claim 32 where the organosilane disulfides of said organosilane disulfide/trisulfide compounds are selected from at least one of:
3,3'-bis(trimethoxysilylpropyl)disulfide;
3,3'-bis(triethoxysilylpropyl)disulfide;
3,3'-bis(triethoxysilylethyl tolylene)disulfide; and
3,3'-bis(trimethoxysilylethyl tolylene)disulfide.

34. The process of claim 1 wherein said organosilane disulfide of said organosilane disulfide/trisulfide compound is selected from at least one of 3,3'-bis (trimethoxysilylpropyl)disulfide; 3,3'-bis (triethoxysilylpropyl)disulfide; 3,3'-bis(triethoxysilylethyl tolylene)disulfide; and 3,3'-bis(trimethoxysilylethyl tolylene)disulfide; where said carbon black has a CTAB value in a range of about 80 to about 150 and said silica, alumina and aluminosilicate have a BET surface area in a range of about 100 to about 300 square meters per gram, a dibutylphthalate (DBP) absorption value in a range of about 150 to about 350, a CTAB value in a range of about 100 to about 220 and has a mercury porosimetry pore size distribution of: five percent less of its pores with a diameter of less than about 10 nm; 60 to 90 percent of its pores with a diameter of about 10 to about 100 nm; 10 to 30 percent of its pores with a diameter of about 100 to about 1000 nm and 5 to 20 percent of its pores with a diameter of greater than about 1000 nm; wherein said sulfur donor additional additive is selected from at least one of dimorpholine disulfide, dimorpholine tetrasulfide, tetramethyl thiuram tetrasulfide, benzothiazyl-2,N dithiomorpholide, thioplasts, dipentamethylenethiuramhexasulfide and disulfidecaprolactame; wherein said vulcanization accelerator for sulfur vulcanizable elastomers additional additive is selected from at least one of mercaptobenzothiazole, tetramethyl thiuram disulfide, benzothiazole disulfide, diphenylguanidine, zinc dithiocarbamate, alkylphenoldisulfide, zinc butyl xanthate, N-dicyclohexyl-2-benzothiazolesulfenamide, N-cyclohexyl-2-benzothiazolesulfenamide, N-oxydiethylenebenzothiazole-2-sulfenamide, N,N diphenylthiourea, dithiocarbamylesulfenamide, N,N diisopropylbezothiozole-2-sulfenamide, zinc-2-mercaptotoluimidazole, dithiobis(N methyl piperazine), dithiobis(N beta hydroxy ethyl piperazine) and dithiobis (dibenzyl amine); and wherein said organosilane polysulfide additional additive is selected from at least one of 3,3'-bis (trimethoxysilylpropyl)tetrasulfide; 3,3'-bis (triethoxysilylpropyl)tetrasulfide; 3,3'-bis (triethoxysilylethyl tolylene)tetrasulfide; and 3,3'-bis (trimethoxysilylethyl tolylene)tetrasulfide.

35. The process according to claim 34 which comprises the additional step of vulcanizing the prepared rubber composition at a temperature in a range of from about 140° C. to about 190° C.

36. A rubber composition prepared according to the process of claim 35.

37. The process according to claim 34 which comprises the additional steps of preparing an assembly of a tire of sulfur vulcanizable rubber with a tread comprised of the said rubber composition and vulcanizing the assembly at a temperature in a range of about 140° C. to about 190° C.

38. A tire prepared according to the process of claim 37.

39. The process according to claim 4 where, for said sulfur vulcanizable elastomer, said conjugated dienes are selected from isoprene and 1,3-butadiene and said vinyl aromatic compounds are selected from styrene and alpha methyl styrene.

40. The process according to claim 4 where the sulfur vulcanizable elastomer is selected from at least one of natural and synthetic cis 1,4-polyisoprene rubber, emulsion polymerization prepared styrene/butadiene copolymer rubber, organic solution polymerization prepared styrene/butadiene copolymer rubber, 3,4-polyisoprene rubber, isoprene/butadiene rubber, styrene/isoprene/butadiene terpolymer rubbers, cis 1,4-polybutadiene rubber, and emulsion polymerization prepared styrene/butadiene/acrylonitrile terpolymer rubber and butadiene/acrylonitrile copolymer rubber.

41. The process according to claim 4 wherein the silica is characterized by having a BET surface area in a range of about 100 to about 300 square meters per gram and a dibutylphthalate (DBP) absorption value in a range of about 150 to about 350, a CTAB value in a range of about 100 to about 220, and a mercury porosimetry pore size distribution of: five percent less of its pores with a diameter of less than about 10 nm; 60 to 90 percent of its pores with a diameter of about 10 to about 100 nm; 10 to 30 percent of its pores with a diameter of about 100 to about 1000 nm and 5 to 20 percent of its pores with a diameter of greater than about 1000 nm.

42. The process according to claim 41 in which said filler is comprised of about 15 to about 100 weight percent precipitated silica and, correspondingly, from 5 to about 85 weight percent carbon black; wherein said carbon black is has a CTAB value in a range of about 80 to about 150.

43. The process according to claim 42 wherein the filler is comprised of about 60 to about 95 weight percent silica and, correspondingly, about 40 to about 5 weight percent carbon black.

44. The process according to claim 4 wherein said filler is comprised of about 15 to about 100 weight percent alumina and, correspondingly, from 5 to about 85 weight percent carbon black; wherein said carbon black has a CTAB value in a range of about 80 to about 150 and said alumina has a CTAB value in a range of about 100 to about 220, and a mercury porosimetry pore size distribution of: five percent less of its pores with a diameter of less than about 10 nm; 60 to 90 percent of its pores with a diameter of about 10 to about 100 nm; 10 to 30 percent of its pores with a diameter of about 100 to about 1000 nm and 5 to 20 percent of its pores with a diameter of greater than about 1000 nm.

45. The process according to claim 44 wherein said filler is comprised of about 60 to about 95 weight percent alumina and, correspondingly, about 40 to about 5 weight percent carbon black.

46. The process according to claim 4 wherein said filler is comprised of about 15 to about 100 weight percent aluminosilicate and, correspondingly, from about 5 to about 85 weight percent carbon black; wherein said carbon black has a CTAB in a range of about 80 to about 150 and wherein said aluminosilicate has a CTAB value in a range of about 100 to about 220, and a mercury porosimetry pore size distribution of: five percent less of its pores with a diameter of less than about 10 nm; 60 to 90 percent of its pores with a diameter of about 10 to about 100 nm; 10 to 30 percent of its pores with a diameter of about 100 to about 1000 nm and 5 to 20 percent of its pores with a diameter of greater than about 1000 nm.

47. The process according to claim 46 wherein said filler is comprised of about 60 to about 95 weight percent aluminosilicate and, correspondingly, about 40 to about 5 weight percent carbon black.

48. The process according to claim 46 where said aluminosilicate is selected from at least one of at least one of (a) natural aluminosilicates selected from Muscovite, Beryl, Dichroite, Sepiolite and Kaolinite and (b) synthetic aluminosilicates prepared by (i) co-precipitation of a basic solution, or mixture of silicate and aluminate or by (ii) a chemical reaction between silanols of a silicon dioxide and $NaAlO_2$.

49. The process according to claim 48 where for said synthetic aluminosilicate about 5 to about 95 percent of its surface is composed of silica moieties and, correspondingly, about 95 to about 5 percent of its surface is composed of aluminum moieties.

50. The process according to claim 46 where said synthetic aluminosilicate is represented by the formula:

$[(Al_2O_3)_x \cdot (SiO_2)_y \cdot MO]$; where M is magnesium or calcium.

51. The process according to claim 4 wherein said sulfur donor additional additive is selected from at least one of dimorpholine tetrasulfide, tetramethyl thiuram tetrasulfide, benzothiazyl-2,N dithiomorpholide, thioplasts, dipentamethylenethiuramhexasulfide and disulfidecaprolactame.

52. The process according to claim 4 wherein said vulcanization accelerator for sulfur vulcanizable elastomers additional additive is selected from at least one of mercaptobenzothiazole, tetramethyl thiuram disulfide, benzothiazole disulfide, diphenylguanidine, zinc dithiocarbamate, alkylphenoldisulfide, zinc butyl xanthate, N-dicyclohexyl- 2-benzothiazolesulfenamide, N-cyclohexyl-2-benzothiazolesulfenamide, N-oxydiethylenebenzothiazole-2-sulfenamide, N,N diphenylthiourea, dithiocarbamylesulfenamide, N,N diisopropylbezothiozole-2-sulfenamide, zinc-2-mercaptotoluimidazole, dithiobis(N methyl piperazine), dithiobis(N beta hydroxy ethyl piperazine) and dithiobis (dibenzyl amine).

53. The process according to claim 4 wherein said sulfur donor additional additive is selected from at least one of 3,3'-bis(trimethoxysilylpropyl)tetrasulfide; 3,3'-bis (triethoxysilylpropyl)tetrasulfide; 3,3'-bis (triethoxysilylethyl tolylene)tetrasulfide; and 3,3'-bis (trimethoxysilylethyl tolylene)tetrasulfide.

54. The process according to claim 4 wherein for the said organosilane polysulfide compound, said $R^2$ radicals are alkyl radicals and said $R^1$ radicals are selected from alkaryl, phenyl and haloaryl radicals.

55. The process according to claim 54 wherein said alkyl radicals are selected from methyl, ethyl, n-propyl and n-decyl radicals; said aralkyl radicals are selected from benzyl and alpha, alpha dimethylbenzyl radicals; said alkaryl radicals are selected from p-tolyl and p-nonylphenol radicals; and said haloaryl radical is a p-chlorophenol radical.

56. The process according to claim 4 wherein organosilane disulfides of said organosilane disulfide/trisulfide compounds are selected from at least one of:
2,2'-bis(trimethoxysilylethyl)disulfide;
3,3'-bis(trimethoxysilylpropyl)disulfide;
3,3'-bis(triethoxysilylpropyl)disulfide;
2,2'-bis(triethoxysilylpropyl)disulfide;
2,2'-bis(tripropoxysilylethyl)disulfide;
2,2'-bi(tri-sec.butoxysilylethyl)disulfide;
3,3'-bis(tri-t-butoxyethyl)disulfide;
3,3'-bis(triethoxysilylethyl tolylene)disulfide;
3,3'-bis(trimethoxysilylethyl tolylene)disulfide;
3,3'-bis(triisopropoxypropyl)disulfide;
3,3'-bis(trioctoxypropyl)disulfide;
2,2'-bis(2'-ethylhexoxysilylethyl)disulfide;
2,2'-bis(dimethoxy ethoxysilylethyl)disulfide;
3,3'-bis(methoxyethoxypropoxysilylpropyl)disulfide;
3,3'-bis(methoxy dimethylsilylpropyl)disulfide;
3,3'-bis(cyclohexoxy dimethylsilylpropyl)disulfide;
4,4'-bis(trimethoxysilylbutyl)disulfide;
3,3'-bis(trimethoxysilyl-3-methylpropyl)disulfide;
3,3'-bis(tripropoxysilyl-3-methylpropyl)disulfide;
3,3'-bis(dimethoxy methylsilyl-3-ethylpropyl)disulfide;
3,3'-bis(trimethoxysilyl-2-methylpropyl)disulfide;
3,3'-bis(dimethoxyphenylsilyl-2-methylpropyl)disulfide;
3,3'-bis(trimethoxysilylcyclohexyl)disulfide;
12,12'-bis(trimethoxysilyldodecyl)disulfide;
12,12'-bis(triethoxysilyldodecyl)disulfide;
18,18'-bis(trimethoxysilyloctadecyl)disulfide;
18,18'-bis(methoxydimethylsilyloctadecyl)disulfide;
2,2-'-bis(trimethoxysilyl-2-methylethyl)disulfide;
2,2'-bis(triethoxysilyl-2-methylethyl)disulfide;
2,2'-bis(tripropoxysilyl-2-methylethyl)disulfide; and
2,2'-bis(trioctoxysilyl-2-methylethyl)disulfide.

57. The process according to claim 4 where organosilane disulfides of said organosilane disulfide/trisulfide compounds are selected from at least one of:
3,3'-bis(trimethoxysilylpropyl)disulfide;
3,3'-bis(triethoxysilylpropyl)disulfide;
3,3'-bis(triethoxysilylethyl tolylene)disulfide; and
3,3'-bis(trimethoxysilylethyl tolylene)disulfide.

58. The process according to claim 4 where, for said organosilane disulfide/trisulfide compound, said $R^2$ radicals are alkyl radicals selected from methyl, ethyl, n-propyl and n-decyl radicals; and said $R^1$ radicals are selected from benzyl, alpha, alpha dimethylbenzyl, p-tolyl, p-nonylphenol and p-chlorophenol radicals.

59. The process according to claim 58 where organosilane disulfides of said organosilane disulfide/trisulfide compounds are selected from at least one of:
3,3'-bis(trimethoxysilylpropyl)disulfide;
3,3'-bis(triethoxysilylpropyl)disulfide;
3,3'-bis(triethoxysilylethyl tolylene)disulfide; and
3,3'-bis(trimethoxysilylethyl tolylene)disulfide.

60. The process according to claim 4 wherein said organosilane disulfide of said organosilane disulfide/trisulfide compound is selected from at least one of 3,3'-bis(trimethoxysilylpropyl) disulfide; 3,3'-bis(triethoxysilylpropyl)disulfide; 3,3'-bis(triethoxysilylethyl tolylene)disulfide; and 3,3'-bis(trimethoxysilylethyl tolylene)disulfide; where said carbon black has a CTAB value in a range of about 80 to about 150 and said silica, alumina and aluminosilicate have a BET surface area in a range of about 100 to about 300 square meters per gram, a dibutylphthalate (DBP) absorption value in a range of about 150 to about 350, a CTAB value in a range of about 100 to about 220 and a mercury porosimetry pore size distribution of: five percent less of its pores with a diameter of less than about 10 nm; 60 to 90 percent of its pores with a diameter of about 10 to about 100 nm; 10 to 30 percent of its pores with a diameter of about 100 to about 1000 nm and 5 to 20 percent of its pores with a diameter of greater than about 1000 nm.; wherein said sulfur donor additional additive is selected from at least one of dimorpholine disulfide, dimorpholine tetrasulfide, tetramethyl thiuram tetrasulfide, benzothiazyl-2,N dithiomorpholide, thioplasts, dipentamethylenethiuramhexasulfide and disulfidecaprolactame; wherein said vulcanization accelerator for sulfur vulcanizable elastomers additional additive is selected from at least one of mercaptobenzothiazole, tetramethyl thiuram disulfide, benzothiazole disulfide, diphenylguanidine, zinc dithiocarbamate, alkylphenoldisulfide, zinc butyl xanthate, N-dicyclohexyl-2-benzothiazolesulfenamide, N-cyclohexyl-2-benzothiazolesulfenamide, N-oxydiethylenebenzothiazole-2-sulfenamide, N,N diphenylthiourea, dithiocarbamylesulfenamide, N,N diisopropylbezothiozole-2-sulfenamide, zinc-2-mercaptotoluimidazole, dithiobis(N methyl piperazine), dithiobis(N beta hydroxy ethyl piperazine) and dithiobis (dibenzyl amine); and wherein said organosilane polysulfide additional additive is selected from at least one of 3,3'-bis(trimethoxysilylpropyl)tetrasulfide; 3,3'-bis(triethoxysilylpropyl)tetrasulfide; 3,3'-bis(triethoxysilylethyl tolylene)tetrasulfide; and 3,3'-bis(trimethoxysilylethyl tolylene)tetrasulfide.

61. The process according to claim 4 which comprises the additional step of vulcanizing the prepared rubber composition at a temperature in a range of from about 140° C. to about 190° C.

62. A vulcanized rubber composition prepared according to the process of claim 61.

63. The process according to claim 60 which comprises the additional steps of preparing an assembly of a tire of sulfur vulcanizable rubber with a tread comprised of the said rubber composition and vulcanizing the assembly at a temperature in a range of about 140° C. to about 190° C.

64. A vulcanized rubber tire prepared according to the process of claim 63.

65. The process according to claim 60 wherein, for said organosilane compound, at least 95 percent of n is 2.

66. The process according to claim 65 which comprises the additional step of vulcanizing the prepared rubber composition at a temperature in a range of from about 140° C. to about 190° C.

67. A vulcanized rubber composition prepared according to the process of claim 66.

68. The process according to claim 65 which comprises the additional steps of preparing an assembly of a tire of sulfur vulcanizable rubber with a tread comprised of the said rubber composition and vulcanizing the assembly at a temperature in a range of about 140° to about 190° C.

69. A vulcanized rubber tire prepared according to the process of claim 68.

70. The process of claim 4 wherein said preparatory steps (A) are composed of at least two sequential mixing steps in which said elastomer, said particulate filler and said organosilane polysulfide compound are added to one or more of said sequential mixing steps and wherein said sulfur source and/or vulcanization accelerator is/are added in a subsequent sequential preparatory mixing step.

71. The process of claim 4 wherein said preparatory steps (A) are composed of at least two sequential mixing steps in which about 20 to about 60 weight percent of the silica, the said organosilane disulfide/trisulfide compound and said sulfur source and/or vulcanization accelerator are added in one or more mixing steps and the remainder thereof added in at least one subsequent preparatory mix step.

72. The process of claim 1 wherein said organosilane disulfide/trisulfide compound is added to said thermomechanical preparatory mixing in a form of a particulate comprised of about 25 to about 75 weight percent of said organosilane disulfide/trisulfide compound and, correspondingly, about 75 to about 25 weight percent of particulate carbon black.

73. The process of claim 4 wherein said organosilane disulfide/trisulfide compound is added to said thermomechanical preparatory mixing in a form of a particulate comprised of about 25 to about 75 weight percent of said organosilane disulfide/trisulfide compound and, correspondingly, about 75 to about 25 weight percent of particulate carbon black.

74. The process of claim 60 wherein said organosilane disulfide/trisulfide compound is added to said thermomechanical preparatory mixing in a form of a particulate comprised of about 25 to about 75 weight percent of said organosilane disulfide/trisulfide compound and, correspondingly, about 75 to about 25 weight percent of particulate carbon black.

75. The process of claim 60 wherein said organosilane disulfide/trisulfide compound is added to said thermomechanical preparatory mixing in a form of a particulate comprised of about 25 to about 75 weight percent of said organosilane disulfide/trisulfide compound and, correspondingly, about 75 to about 25 weight percent of particulate carbon black.

76. The process according to claim 60 which comprises the additional steps of preparing an assembly of a tire of sulfur vulcanizable rubber with a tread comprised of the said rubber composition and vulcanizing the assembly at a temperature in a range of about 140° C. to about 190° C.; and wherein the organosilane disulfide/trisulfide compound is added to said thermomechanical preparatory mixing in a form of a particulate comprised of about 40 to about 60 weight percent of said organosilane disulfide/trisulfide compound and, correspondingly, about 60 to about 40 weight percent of particulate carbon black.

* * * * *